(12) United States Patent
Van Rens et al.

(10) Patent No.: US 10,163,054 B2
(45) Date of Patent: Dec. 25, 2018

(54) TAG ASSEMBLY (75) Inventors: Bas Jan Emile Van Rens, Haarlem (NL); Adriaan Klaas Verwoerd, Hoofeldorp (NL); Reinerus Mathijs Willie Gerritsen, Malden (NL)

(73) Assignee: AMB I.T. HOLDING B.V., Pj Haarlem (NL)

(*) Notice: Subject to any disclaimer, the term of this patent is extended or adjusted under 35 U.S.C. 154(b) by 0 days.

(21) Appl. No.: 14/357,674

(22) PCT Filed: Nov. 10, 2011

(86) PCT No.: PCT/EP2011/069874
§ 371 (c)(1),
(2), (4) Date: Jun. 25, 2014

(87) PCT Pub. No.: WO2013/068043
PCT Pub. Date: May 16, 2013

(65) Prior Publication Data
US 2014/0319225 A1    Oct. 30, 2014

(51) Int. Cl.
*H01Q 1/22* (2006.01)
*H01Q 1/27* (2006.01)
*G06K 19/077* (2006.01)

(52) U.S. Cl.
CPC . *G06K 19/07762* (2013.01); *G06K 19/07758* (2013.01); *G06K 19/07771* (2013.01); *H01Q 1/2225* (2013.01); *H01Q 1/273* (2013.01)

(58) Field of Classification Search
CPC ......... H01L 2924/00; H01L 2924/1301; H01L 2924/13034; H01L 2924/1305;
(Continued)

(56) References Cited

U.S. PATENT DOCUMENTS 4,318,420 A * 3/1982 Calvert ............................ 137/74
5,087,506 A * 2/1992 Palumbo ............... A61F 13/532
428/192

(Continued)

FOREIGN PATENT DOCUMENTS

CN     102119395 A     7/2011
EP     2 400 436 A2    12/2011
(Continued)

OTHER PUBLICATIONS

Dec. 1, 2012 International Search Report issued in International Application No. PCT/EP2011/069874.
(Continued)

*Primary Examiner* — Thien M Le
*Assistant Examiner* — Tae W Kim
(74) *Attorney, Agent, or Firm* — Oliff PLC

(57) ABSTRACT

A tag assembly is described wherein the tag assembly is affixable to clothing and/or a body and wherein the assembly includes a support sheet; a tag disposed on the support sheet, the tag being configured to transmit a signal to a receiver; and, an expandable spacer structure disposed the support sheet, the expandable spacer structure providing a predetermined spacing between the tag and the body, the expandable spacer being configured to expand from a thin non-expanded state to a expanded state of a predetermined spacer thickness.

11 Claims, 11 Drawing Sheets

(58) Field of Classification Search
CPC ... H01L 2924/13055; H01L 2924/1306; H01L 2924/00014; G06K 19/07749; G06K 19/07771; G06K 19/07786; G06K 7/10178
USPC .......................................................... 235/488
See application file for complete search history.

(56) References Cited

U.S. PATENT DOCUMENTS

| | | | |
|---|---|---|---|
| 5,497,140 A * | 3/1996 | Tuttle | 340/10.1 |
| 6,147,604 A * | 11/2000 | Wiklof | G06K 19/07749 235/487 |
| 6,542,114 B1 | 4/2003 | Eagleson et al. | |
| 6,569,508 B2 | 5/2003 | Babb et al. | |
| 7,948,383 B2 | 5/2011 | Lamp | |
| 2002/0167450 A1 | 11/2002 | Korden et al. | |
| 2003/0114818 A1* | 6/2003 | Benecke | A61F 13/505 604/378 |
| 2006/0250254 A1* | 11/2006 | Harris | G06K 19/07771 340/572.8 |
| 2007/0112398 A1* | 5/2007 | Stevenson | A61N 1/05 607/63 |
| 2007/0164866 A1 | 7/2007 | Robin et al. | |
| 2008/0018428 A1* | 1/2008 | Nakamura et al. | 340/10.1 |
| 2009/0309703 A1* | 12/2009 | Forster | 340/10.1 |
| 2009/0309735 A1* | 12/2009 | Lamp | 340/572.8 |
| 2011/0018689 A1* | 1/2011 | McAllister et al. | 340/10.1 |
| 2011/0024181 A1* | 2/2011 | Phillips | 174/350 |
| 2011/0233281 A1 | 9/2011 | Howell | |
| 2011/0234383 A1* | 9/2011 | Hansen | G06K 19/07749 340/10.4 |
| 2011/0315776 A1* | 12/2011 | Baba et al. | 235/492 |

FOREIGN PATENT DOCUMENTS

| | | |
|---|---|---|
| JP | 2004510190 A | 4/2004 |
| JP | 2006145981 A | 6/2006 |
| JP | 2007066048 A | 3/2007 |
| JP | 2009060217 A | 3/2009 |
| JP | 2010-079801 A | 4/2010 |
| JP | 2010086196 A | 4/2010 |
| JP | 2010262538 A | 11/2010 |
| JP | 2010262540 A | 11/2010 |
| JP | 2011159212 A | 8/2011 |
| JP | 5972388 B2 | 8/2016 |
| WO | WO 00/21031 A1 | 4/2000 |

OTHER PUBLICATIONS

Dec. 1, 2012 Written Opinion issued in International Application No. PCT/EP2011/069874.
Aug. 27, 2015 Office Action issued in Japanese Patent Application No. 2014-540325.
English Translation of Mar. 23, 2016 Office Action issued in Taiwanese Patent Application No. 101141968.
Jun. 3, 2016 Office Action issued in Chinese Patent Application No. 201180076251.2.
Sep. 27, 2016 Office Action issued in European Patent Application No. 16170864.9.
Feb. 13, 2017 Office Action issued in Japanese Patent Application No. 2016-059025.
Jul. 13, 2017 Office Action issued in Japanese Patent Application No. 2016-059025.
Jun. 13, 2017 Office Action issued in Chinese Patent Application No. 201180076251.2.

* cited by examiner

TAG ASSEMBLY

FIELD OF THE INVENTION

The invention relates to a tag assembly, and, in particular, though not exclusively, to a tag assembly and a tag structure comprising an expandable spacer and a sports bib for use in such tag assembly.

BACKGROUND OF THE INVENTION

Radio Frequency Identification (RFID) tags are widely used for automatic time and/or location registration systems in sporting events. Typically an RFID tag comprises a microchip combined with an antenna and is structured to allow attachment to an object to be detected. In such time registration systems every participant is provided with an RFID tag, which is removable secured to a shoe or a bib comprising a number, which is associated with the name and/or address of the participant. If a participant crosses a detection antenna an electro-magnetical coupling between the tag and the antenna is established thereby allowing information exchange, e.g. an identify number associated with the tag, between the tag and a detector connected to the antenna.

Currently there is a development towards the use of so-called ultra-high frequency (UHF) tags, which use frequency in the UHF band between approximately 860 and 960 MHz. These tags are much cheaper (so that they can be used as a one-time use disposable tag), are less in weight, and can be read faster and from larger distances when compared with low frequency tags. From a logistic and organisational point of view, tags are preferably distributed together with or attached to the bib so that there is an unambiguous one-to-one relation between the tag and the bib. The bib is fixed to the shirt such that the bib is located in front of the chest of the participant.

When fixing an UHF tag to a bib certain problems occur. One problem relates to the fact that the tag is within close proximity of the body, which for the tag functions as a dielectric of relatively high dielectric constant. The proximity of the body changes the impedance of the tag antenna thereby "detuning" the tag away from its optimum working point. Due to this detuning effect, the tag may not able to generate detectable modulated backscatter signal. The effect of detuning is further enhanced in a wet environment, e.g. wet and sweaty clothing and/or body of an athlete. This way, the signal may further deteriorate thereby increasing the risk that a participant crossing or passing a detection antenna is not or at least not correctly registered by the timing system.

In order to lift at least part of this problem, a spacer in the vicinity of the tag may be used such that at least a certain distance between the tag and the wet clothes and/or body is provided. Such spacer may have the form of a strip of lightweight foam attached to or in the vicinity of the tag. Ideally such spacer should guarantee a spacing distance of about 10 mm, however such thickness makes such tag bib assemblies not suitable for mass distribution (by post) and storage (e.g. millions or more). Therefore, in practice, spacers are used which are thinner than the desirable optimal thickness. Hence, conventional spacers thus allow only sub-optimal performance of the tag.

A further problem associated with the use of a tag bib assembly is that the tag signal may be influenced by nearby objects. Especially when a lot of participants are crossing an antenna simultaneously, the presence of other persons in the direct proximity of the radiated signal may cause that only a very small part of the signal will be picked up by the detection antenna of the timing system. Hence, when using a tag bib assembly, it is desired that the tag signal is directed towards the detection antenna.

U.S. Pat. No. 7,948,383 describes an RFID tag assembly for a shoe. In particular, the tag is removed from a bib and secured to a participant's shoe prior to a race. Attaching the RFID tag to the shoe requires multiple actions of the user. Improper installation of the tag to the shoe may result in a disfunctioning or even a non-functioning tag.

Accordingly, there is a need to provide an improved tag assembly, which at least alleviates at least part of these problems. In particular, there is a need for improved tag bib assemblies, in particular UHF tag bib assemblies, which are suitable for fixing to the shirt of a participant and which are not or much less affected by the wet clothes and/or body of the participant. Further, there is a need for improved tag bib assemblies, which allow the generation of a signal, which is focussed towards the detection antenna.

SUMMARY OF THE INVENTION

It is an objective of the invention to reduce or eliminate at least one of the drawbacks known in the prior art. In a first aspect the invention may relate to a tag assembly affixable to clothing and/or body, wherein said assembly may comprise: a support sheet; a tag disposed on said support sheet, said tag being configured to transmit a signal to a receiver; and, an expandable spacer structure disposed said support sheet, said expandable spacer structure providing a predetermined spacing between said tag and said body, said expandable spacer being configured to expand from a non-expanded state to a expanded state of a predetermined spacer thickness.

The advantageous expandable spacer may be in the form of a thin flexible sheet or structure having thin a non-expanded state (the spacer may have a thickness of approximately less than 3 millimeters, preferably less than 2 millimeters) providing a bib tag assembly which may be easily distributed and stored; and, an expanded state, wherein the material or structure may have a desired thickness so that is functions as a spacer for eliminating or at least decreasing detuning of the tag due to the close presence of the body of the wearer of the bib tag assembly. In the expanded state, the spacer provides a desired distance between the tag and the wet shirt and/or body such that the negative influence of the wet shirt and/or body are considerably reduced.

In an embodiment said expandable spacer may comprise one or more pieces of absorbing material adapted to expand at least in one dimension in a damp and/or wet environment, preferably said absorbing material comprising pressed cellulose. In this embodiment, expansion of the spacer does not require any action of the user thereby reducing the risk of tag that does not function properly.

In an embodiment said expandable spacer may comprise one or more pieces of resilient material adapted to adjust at least one dimension in response to a change in pressure and/or an applied force. In an embodiment said non-expandable state may include said resilient material being vacuum packaged or packaged under an applied force, preferably under pressure, said expansion to said expanded stated being initiated by breaking said vacuum or said pressurized package. In an embodiment said expandable spacer may comprise one or more pieces of chemically expandable material. In a further embodiment said expandable spacer may comprise at least one mechanically expandable structure. In yet a further embodiment said at least one mechanical expandable structure may be configured as a foldable structure having collapsed state and an erected state of a predetermined spacer thickness.

In another embodiment said spacer may be configured as a self-erecting structure.

In an embodiment spacer in said expanded state may have a thickness in a range between 5 and 15 mm, preferably between 8 and 12 mm. In an embodiment said spacer in said non-expanded state may have a thickness smaller than 5 mm, preferably smaller than 3 mm.

In an embodiment said tag may comprise at least one metallic dipole antenna structure and wherein said spacer structure may be located within the proximity of said antenna structure and/or at least partly on top of said dipole antenna structure.

In an embodiment said tag may be operative in the ultra-high frequency range, preferably in the range between 800 and 1000 MHz In an embodiment said support sheet may be a bib comprising a printed identifier, preferably said transmitted signal comprising an identifier associated with said printed identifier.

In a variant said support sheet may further comprise one or more metallic passive elements for directing at least part of said signal into a predetermined direction. In another variant at least one of said passive elements may be configured as a reflector, preferably the length of said reflector being larger than the length of said tag. In yet another variant at least one of said passive elements may be configured as a director, preferably the length of said director being smaller than the length of said tag. In a further variant at least one of said passive elements may be formed onto said support sheet using conductive ink or coating. The use of passive elements in combination with one or more expandable spacer structures provides a tag assembly which is capable of producing a signal which is not or at least less influenced by the direct proximity of the body and which is effectively focussed into a desired direction.

In yet a further variant said assembly may further comprise a non-expandable spacer structure disposed on said support sheet, said expandable spacer structure providing a predetermined spacing between said tag and said body when said expandable spacer structure is not in its expanded state.

In an variant said non-expandable spacer structure has a thickness between 2 mm and 6 mm.

In an variant said assembly may further comprise at least a dielectric layer disposed between said tag structure and said expandable spacer structure, wherein said dielectric layer comprises a high-dielectric material and wherein said metallic thin-film antenna structure is impedance matched to said processor taking into account the presence of said dielectric layer in the direct proximity of said antenna structure. The presence of a dielectric layer may partially "screen" the proximity of the body away from the tag so that detuning effects associated with the proximity of the body can be considerably reduced.

In a further aspect, the invention may relate to a tag structure comprising: a support substrate; a tag structure comprising a processor, preferably an integrated circuit, connected to a metallic thin-film antenna structure, disposed on said support substrate; and, an expandable spacer structure disposed on said support substrate and disposed at least partly over said tag structure, said expandable spacer structure providing a predetermined spacing between said tag and said body, said expandable spacer being configured to expand from a non-expanded state to a expanded state of a predetermined spacer thickness.

In one embodiment said expandable spacer may comprise one or more pieces of absorbing material adapted to expand at least in one dimension in a damp and/or wet environment, preferably said absorbing material comprising pressed cellulose.

In one embodiment said structure may further comprise at least a dielectric layer disposed between said tag structure and said expandable spacer structure, wherein said dielectric layer comprises a high-dielectric material and wherein said metallic thin-film antenna structure is impedance matched to said processor taking into account the presence of said dielectric layer in the direct proximity of said antenna structure.

In yet another aspect, the invention may relate to a sports bib for use in a tag assembly as described above, said sports bib comprising: a support sheet affixable to clothing and/or body for supporting a tag, said support sheet comprising a printed identifier on a front side; and, an expandable spacer structure disposed on the back side of said support sheet, said expandable spacer structure providing a predetermined spacing between said tag and said body, said expandable spacer being configured to expand from a non-expanded state to a expanded state of a predetermined spacer thickness.

The invention will be further illustrated with reference to the attached drawings, which schematically will show embodiments according to the invention. It will be understood that the invention is not in any way restricted to these specific embodiments.

DETAILED DESCRIPTION

Figure 1:
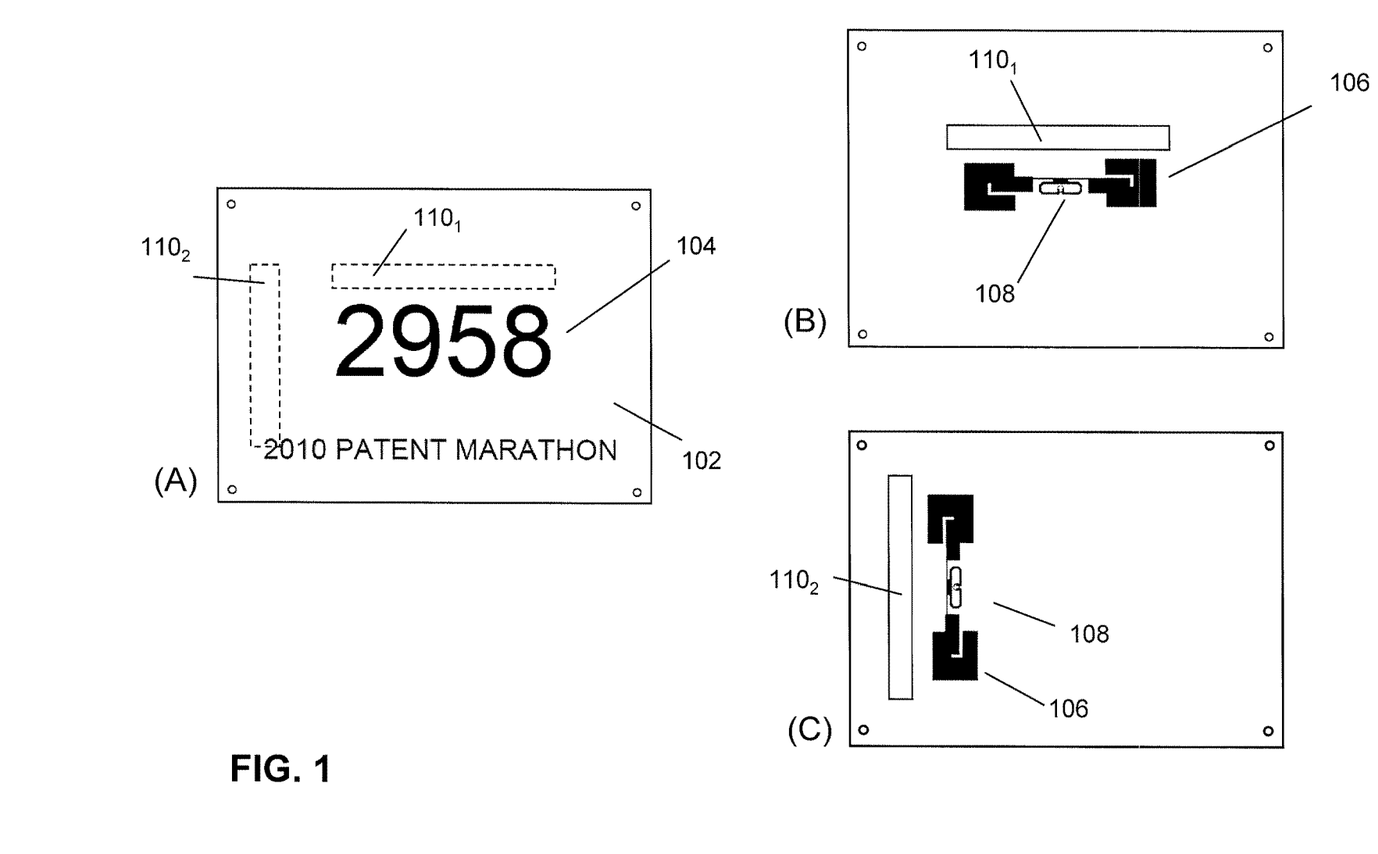
FIG. 1A-1C schematically depict bib tag assemblies according to various embodiment of the invention.

FIG. 1A-1C schematically depict bib tag assemblies according to various embodiment of the invention. In particular, FIGS. 1A and 1B depict the front and backside of a bib tag assembly for use e.g. in a sports event comprising a support sheet 102, e.g. a flexible, light-weight, water-resistant, sheet-like material that is adapted to be affixed to a person through the use of an adhesive or mechanism to pin or tie the support sheet to the person or animal (or clothing on the person or animal). Exemplary materials used for support sheet include fabric, paper, woven sheet, plastic or any combination thereof. Preferably, a front side of the support sheet may display an identifier such as an identifier 104 identifying the person to which the support sheet is affixed. Support sheet 102 may have a rectangular, 4-sided shape, but in other embodiment it may have any suitable shape, e.g., shape of a logo.

FIG. 1B depicts the backside of the support sheet to which at least one tag 108 is affixed. In order to make the tag suitable for a sports timing system, the tag may comprise an antenna 106 for receiving and transmitting signals. In one embodiment, the tag may relate to an UFH tag operating in the UHF frequency range. In more general, the tags or tag structures described below may be configured to operate in the frequency range between 800 and 1000 MHz. In one embodiment, a tag may operate in a frequency range between 860 and 960 MHz. in another embodiment, the tag may operate in a frequency range between 900 and 930 MHz. In yet another embodiment, a tag may operate in a frequency range between 940 and 970 Mhz. The antenna associated with the tag may have a predetermined shape. The antenna may be a metallic (foldable and/or flexible) thin-film layer.

In one embodiment, the tag may have the form of a dipole antenna. The unfolded length of the tag may be approximately half the wavelength of the operation frequency, e.g. between 10-20 cm (900 MHz equals approximately 16 cm). The tag may further comprise a processor, i.e. an RFID-specific processor, for processing signals received by the tag. Tag 108 may be securely attached to support sheet 102 by means such as an adhesive or an adhesive layer. Depending on the application, the tag may be at least partly active and/or passive. In some embodiments, instead of the backside, the tag may be affixed to the front-side of the bib.

The bib tag assembly may further comprise an expandable spacer configured to create a spacing between the tag and the wet clothing and/or body of the participant. Here, an expandable spacer refers to a spacer structure having an adjustable thickness or height or is able to have a particular range of thicknesses or heights. In one embodiment, the expandable spacer may have a collapsed/compressed state with a small thickness or height, and an expanded state with a larger thickness or height.

The spacer may have the form of one or more parts formed of expandable sheet material $110_1$ located in the vicinity and/or (partly) on top of the tag/antenna structure 106,108. The expandable spacer may be configured such that when the bib tag assembly is not in use, (e.g. assembled for distribution to participants of an event), the spacer is in a collapsed (non-expanded) state. In that case, the spacer may be in the form of a thin flexible sheet or structure attached to the backside of the bib. In the non-expanded state, the spacer may have a thickness of approximately less than 3 millimeters, preferably less than 2 millimeters. This way, a bib tag assembly may be very thin so that easy distribution by post is possible.

In contrast, when the expandable spacer is in its expanded state, the material or structure may have a desired thickness so that is functions as a spacer for eliminating or at least decreasing detuning of the tag due to the close presence of the body of the wearer of the bib tag assembly. Desired thicknesses of the expandable spacer in expanded state may be between approximately 5 and 15 mm. For an UHF tag in use, the spacer may expand to a thickness of around 10 mm. In the expanded state, the spacer provides a desired distance between the tag and the wet shirt and/or body such that the negative influence of the wet shirt and/or body are considerably reduced.

In FIG. 1B the tag/antenna structure may be attached to the bib such that its longitudinal axis is parallel to the ground surface. In this configuration, the tag signal may be picked up by a detection antenna, which is located on the ground (e.g. by use of an antenna mat) or above the athlete to be detected. Alternatively, as depicted in FIG. 1C, the tag/antenna structure 106,108 and the associated expandable spacer structure $110_2$ may be attached to the bib such that its longitudinal axis is perpendicular to the ground surface. In that configuration, the tag signal may be picked up by a detection antenna, which is located at at least one side of the athlete's path of travel.

The expandable nature of the spacer may be achieved differently depending on the desired application. For example, the expansion may be achieved by a material that expands in volume to a desired thickness. In another example, the spacer may be enabled by a mechanical structure that expands in size or enforces a certain distance/space between the bib and the body of the user wearing the bib when the structure is in its expanded state.

The expandable spacer may expand in a self-acting manner which does not require no user interaction/configuration or in a manner that requires only little user action/configuration. Moreover, the expandable spacer is configured to expand to a desired height or thickness without the risk of improper expansion of the spacer due to human errors. During shipping, the spacer preferably has collapsed state (i.e., reduced thickness) such that shipping large quantities of the bibs is practical. After shipping, the spacer may expand before the bib is attached to clothing/body, or during the use of the bib, e.g., during a race.

A common material that is expandable is a porous material such as foam and sponge. Foam is capable of expanding in size when gas or moisture fills voids, holes or bubbles in the foam thereby enlarging the volume of the foam. An example of such foam is self-expanding foam used in insulation of homes or grow toys that expand in water. Sponge-like materials are capable of expanding in size when holes in the sponge absorbs moisture or take in air/gas.

Besides absorbing moisture to expand in size, some types of porous material expand and contract in size in response to pressure changes. A porous material that is packaged in a vacuum-sealed bag may be in a compressed form. If the vacuum-seal of the bag is broken, the porous material may expand by taking in air into the pores of the material. Various expandable spacer structures are described hereunder in more detail with reference to FIG. 3-8.

Figure 2A:
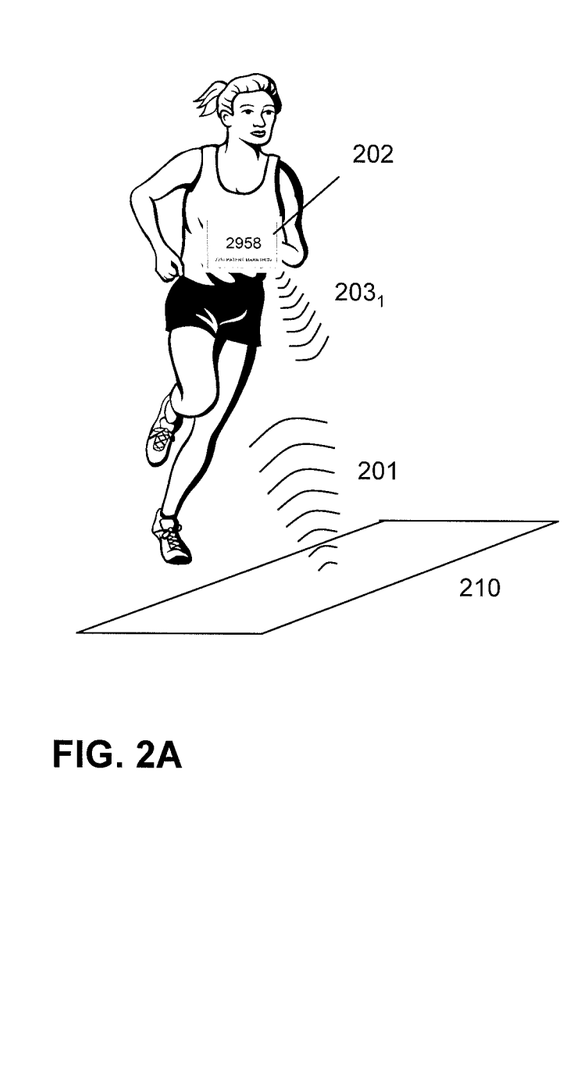
FIG. 2A-2C depict a timing system for use with a bib tag assembly according various embodiments of the invention.
Figure 2B:
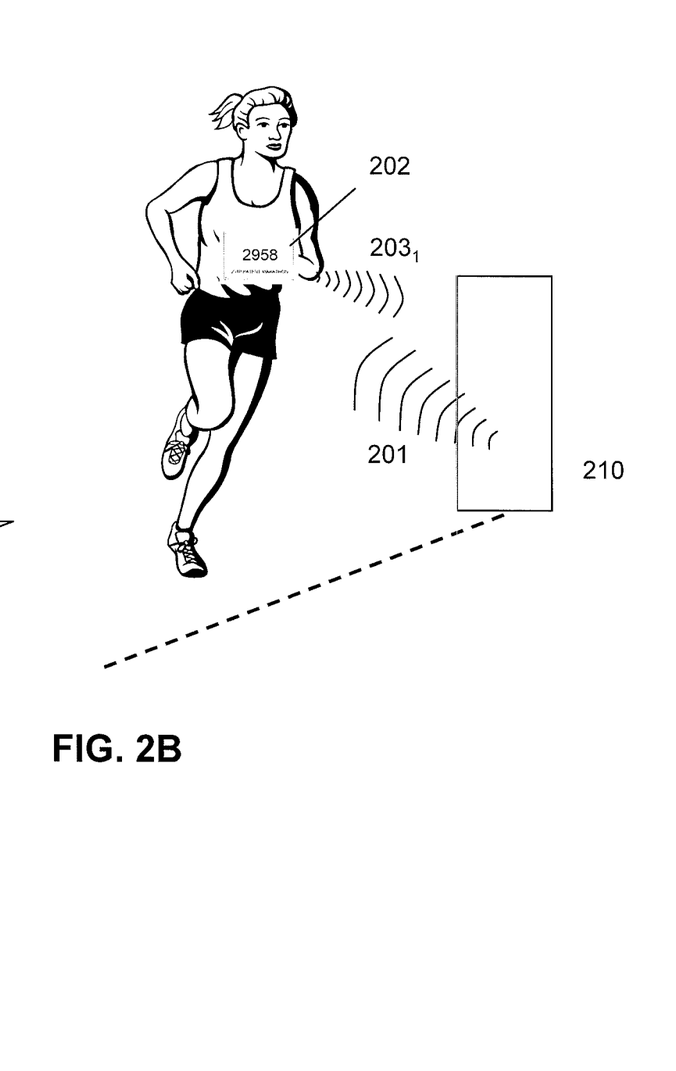
Figure 2C:
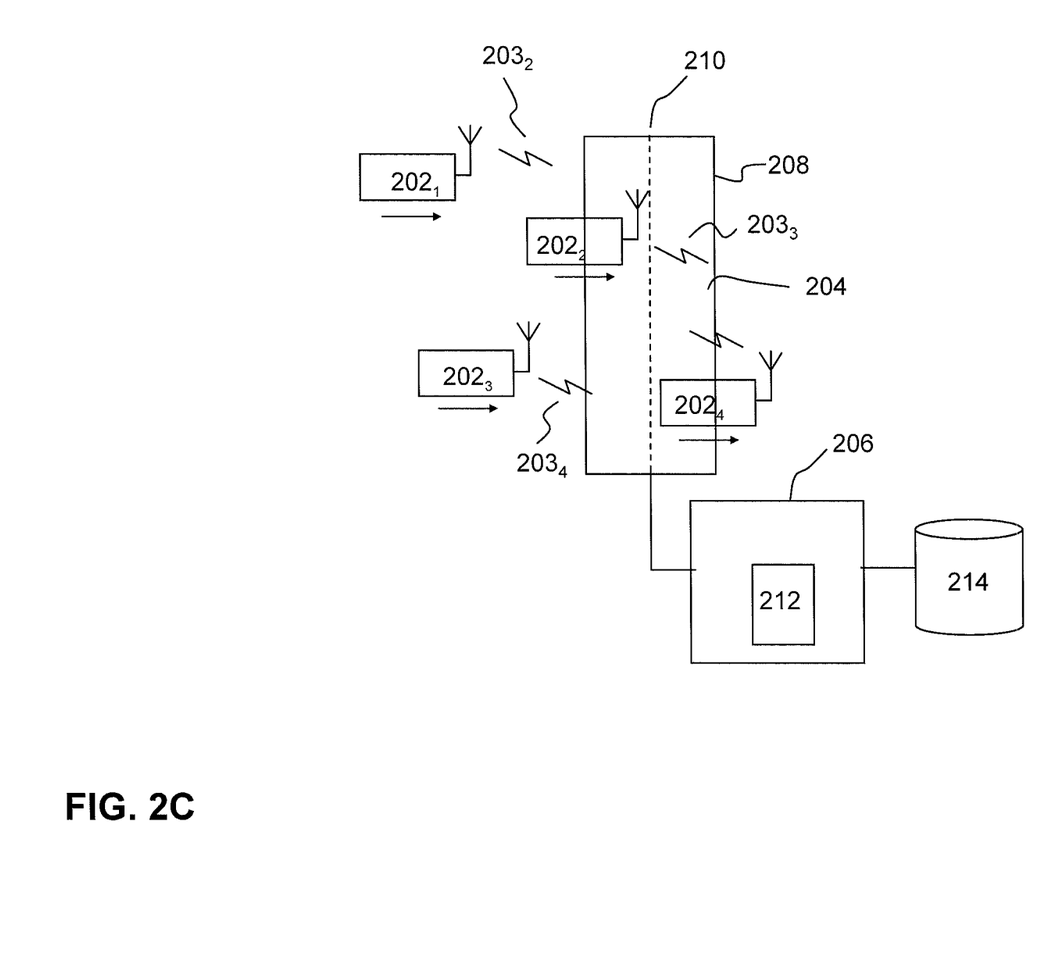
Figure 3:
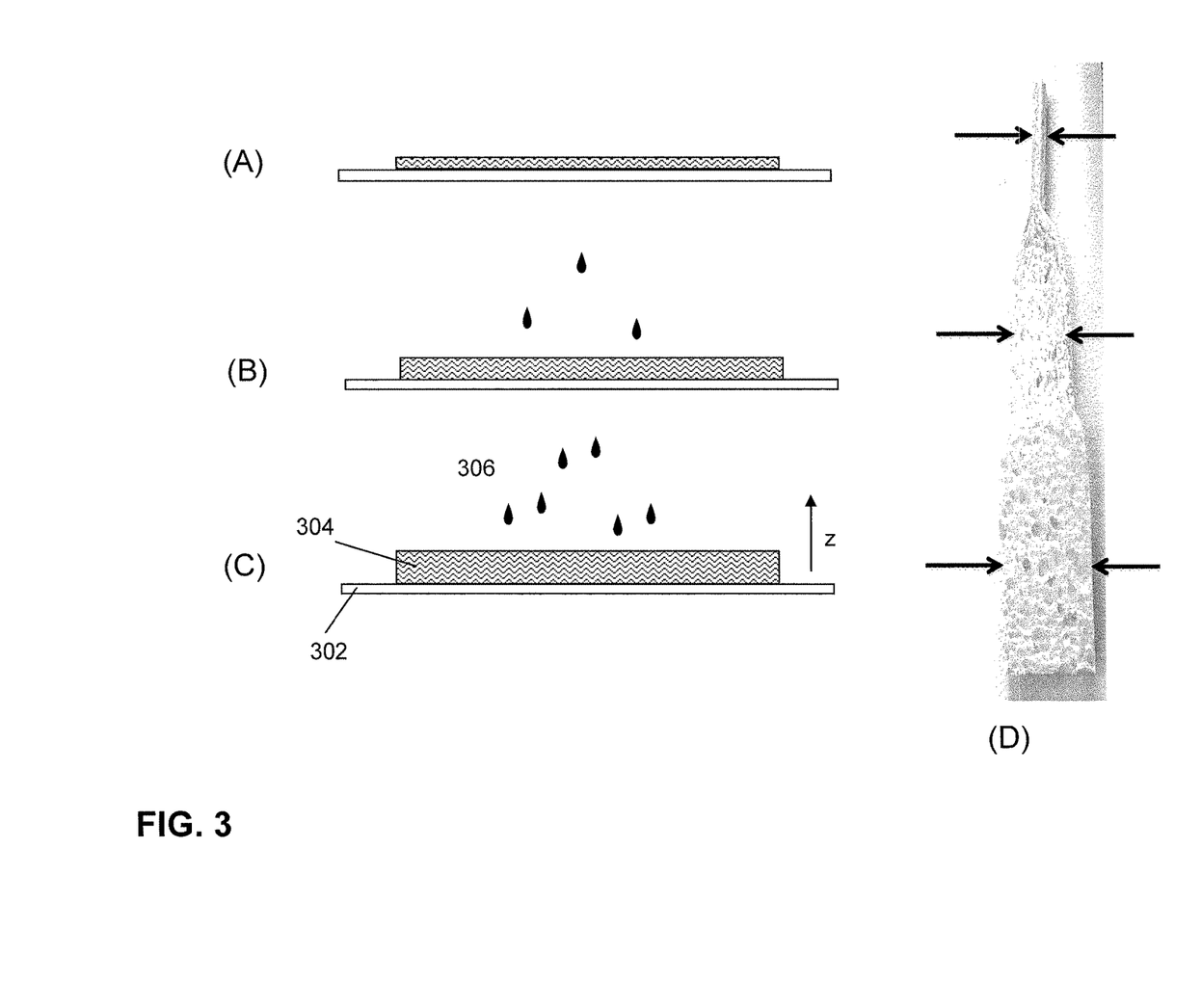
FIG. 3A-3D depict an embodiment of an expandable tag spacer for use in a bib tag assembly according to an embodiment of the invention.

FIG. 2A-2C depict a timing system for use with a bib tag assembly 202 according various embodiments of the invention. In particular, FIG. 2C depicts a schematic of a top-view of a timing system, which may comprise a detection antenna 208 connected to a decoder 206. In one embodiment, the detection antenna may be configured as an elongated antenna mat placed on the ground, in the path of travel of the athletes, wherein the antenna mat may comprise one or more antennas configured to pick up signals transmitted by the bib-tag assembly.

In another embodiment (not shown in FIG. 2C), the detection antenna may be located at the side or above the path of travel of the athletes. Depending on the application different antenna implementations e.g. a patch antenna, a slot antenna or a yagi antenna, may be used.

In one embodiment, the tag may be configured as a passive backscatter system wherein the tag transmits a modulated signal 204 to the detection antenna. If a participant wearing a bib tag assembly $202_{1-5}$ comes in the vicinity of the detection antenna, the tag antenna may receive the modulated signal 201, which is used to power-up the processor in the tag.

FIG. 2A depicts e.g. an implementation wherein a detection antenna mat 210 transmits a modulated signal 201 in a direction opposite to the direction in which the athlete wearing the bib tag is moving. FIG. 2B depicts a detection antenna 210 located at a side of the athlete's path of travel wherein the detection antenna transmits a modulated signal towards on side of the athlete wearing a bib tag.

In response, the tag transmits information stored in the processor back to the detection antenna on the basis of a modulating back-scattered signal $203_1$. This way, the tag may start sending out messages $203_{1-4}$ comprising at least a unique ID identifying the bib. The detection antenna may pick up the transmitted messages and transfer them to the decoder, which comprises a processor for executing an algorithm 212 for determining the (spit) time associated with the tag on the basis of time of detection and the signal strength of the received ID messages. The processed data may be subsequently stored in a storage 214, e.g. a database, for further use.

As the electro-magnetical field produced by the antennas in the antenna mat is strongest above the (longitudinal) centre-line 210 of the antenna, the decoder algorithm may determine the exact passing of a tag above the centre-line of the antenna mat. Determination of the time that the tag passes the centre-line requires measuring the signal strength of multiple messages originating from a tag. It is therefore very important that optimal signal transfer between the tag and the antenna mat is achieved. This may be achieved by bib tag assembly comprising an expandable spacer, which allows expansion to a desired optimum thickness.

FIG. 3A-3D depict an embodiment of an expandable tag spacer for use in a bib tag assembly according to an embodiment of the invention. FIG. 3A-3C depict at least part of a support sheet 302 to which a expandable sheet material 304 is attached to. In this particular embodiment, the sheet material may comprise a thin sheet of water-expandable material. In one embodiment, the water-expandable material may be a pressed sponge-like material, such as pressed celluloses, which absorbs water and/or moisture 306 by using capillary action to fill small holes in the interior of the sponge material. The material may be affixed to the backside of the bib and may have the form of strip in close vicinity and/or (partly) on top of the tag as illustrated.

During use, the sweat of the athlete will be partly absorbed by the water-absorbing material so that the material will start expanding as schematically indicated in FIG. 3A-3C. Preferably, the expansion of the material is limited to one dimension (i.e. the z-dimension perpendicular to the x-y plane of the support sheet) in order to avoid the development of tension in the plane of the bib. The thickness of the water-expandable material in expanded state may be selected such that the spacer has a thickness of about 10 mm, i.e. a spacer thickness which allows good coupling between the tag backscatter signal and the detection antenna in the UHF frequency range. FIG. 3D depicts the effect of the expansion at various stages for a pressed cellulose material. This figure clearly shows that the thickness of the material in the expanded state may be easily 5-15 times the thickness of the material in the pressed state.

It is understood that the water-expandable material is not limited to water-expandable material based on sponge-like materials such pressed celluloses, but may encompass any type of material, which provides considerable expansion in at least one dimension. In one embodiment, the water-expandable material may be biodegradable.

Figure 4A:
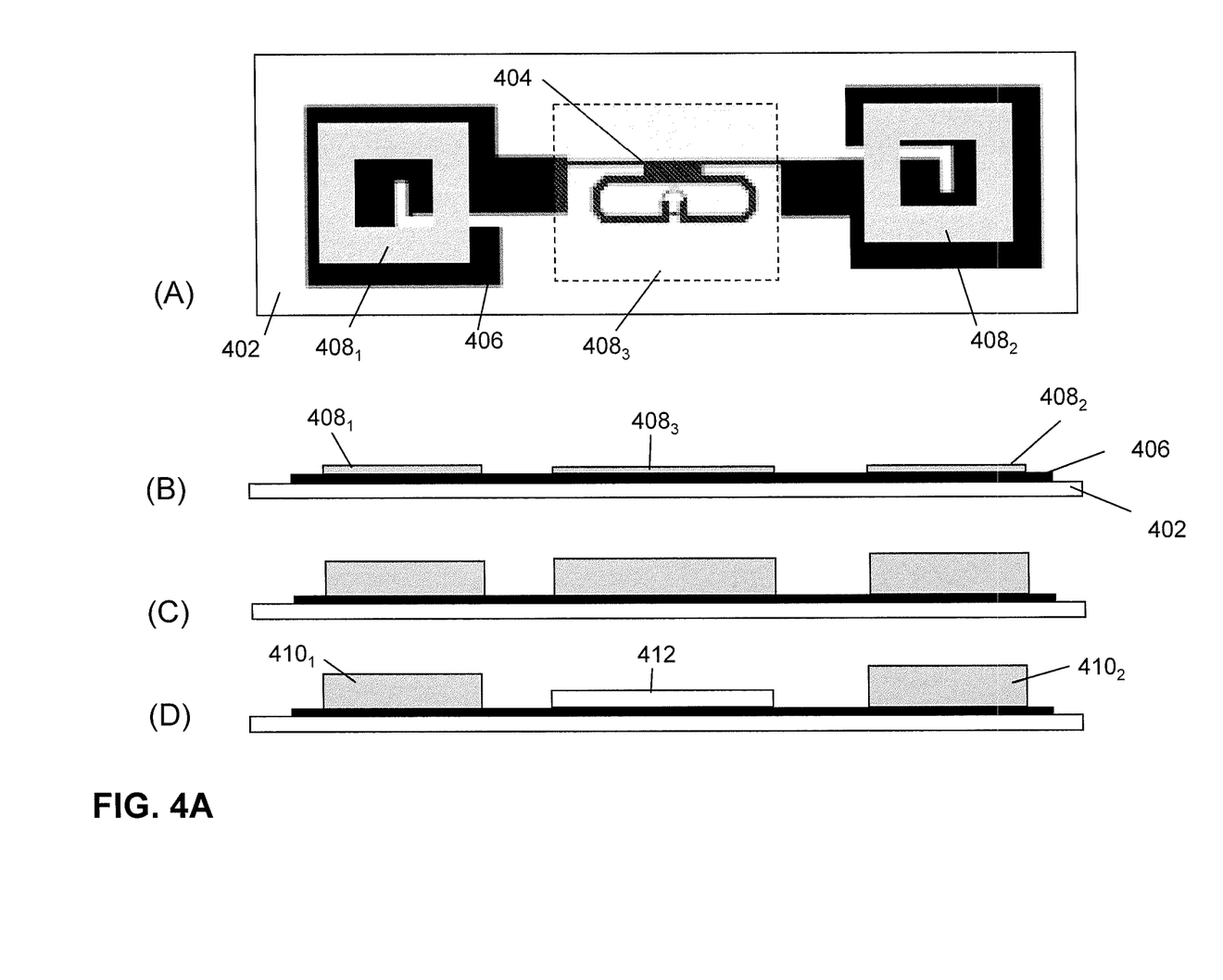
FIG. 4A-4B depicts expandable tag spacers according to various embodiments of the invention.

FIG. 4A depicts expandable tag spacers according to various embodiments of the invention. In particular, FIGS. 4A (A) and (B) depict top view and a side view of an embodiment wherein, the spacer may comprise several pieces of expandable sheet material which may be provided onto (or fixed to) the tag structure. In this particular embodiment, the tag structure may include a processor such as an integrated circuit (IC) for receiving, processing and transmitting RFID signals 404 and the metallic thin-film antenna structure 406, which is provided onto a flexible support sheet 402. The processor and the metallic thin-film antenna structure may be covered with a passivation layer (not shown), e.g. a thin-film insulating layer. The backside of the support sheet may comprise an adhesive such that the tag structure may be attached as a sticker to a bib. Pieces of the expandable sheet material $408_{1-23}$ forming an expandable spacer structure may be attached to the front side of the tag structure.

The expandable spacer structure may comprise e.g. two pieces of expandable material $408_{1,2}$ provided the tag structure area comprising the antenna structures and at least one piece of expandable material $408_3$ provided over the area comprising the tag processor.

FIG. 4A (C) depicts a side view of the tag structure wherein the expandable spacer is in its expanded state.

The layout of the spacer structure may be designed such that with a minimum amount of expandable material a reliable spacing distance between the body and the tag structure is achieved. Hence, in this embodiment, tag-structures may be provisioned with an expandable spacer structure during manufacturing of the tag structure. Alternatively, the tag structure may be provided with a expandable spacer structure in a post-processing step after manufacturing of the tag structure.

FIG. 4A(D) depicts a further embodiment, wherein the tag structure comprises an expandable spacer structure $410_{1,2}$ (e.g. two or more pieces of water-expandable sheet material similar to the ones described with reference to FIG. 4A (A)-(C) and a fixed spacer structure 412 of a predetermined thickness. The fixed spacer structure may have a thickness of about 2-6 mm and functions as a spacer structure for the time that the expandable structure has not expanded to its full height (e.g. at the beginning/start of the race when the athletes are not yet sufficiently sweating in order to active that expandable spacer structures.

Figure 4B:
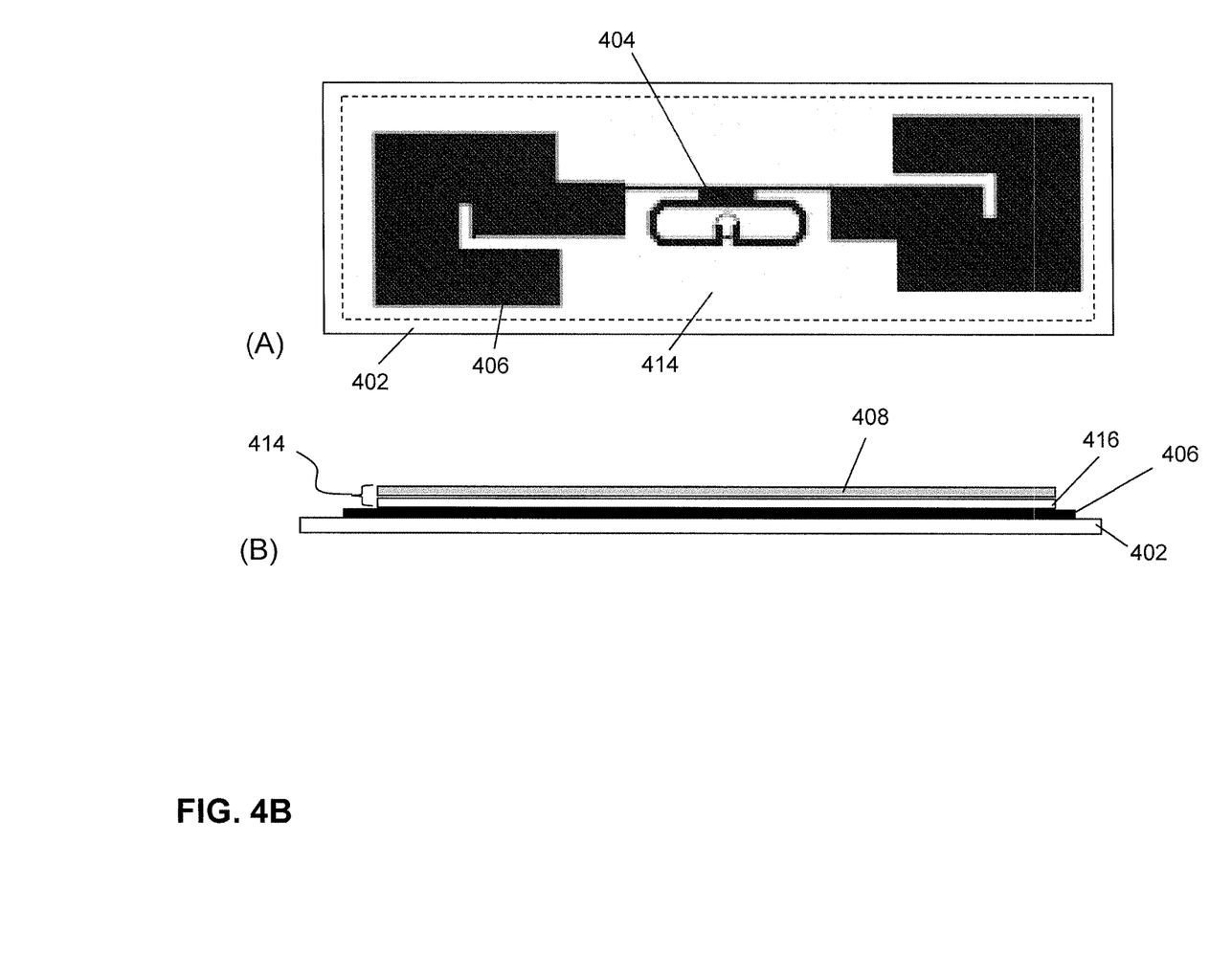
Figure 5:
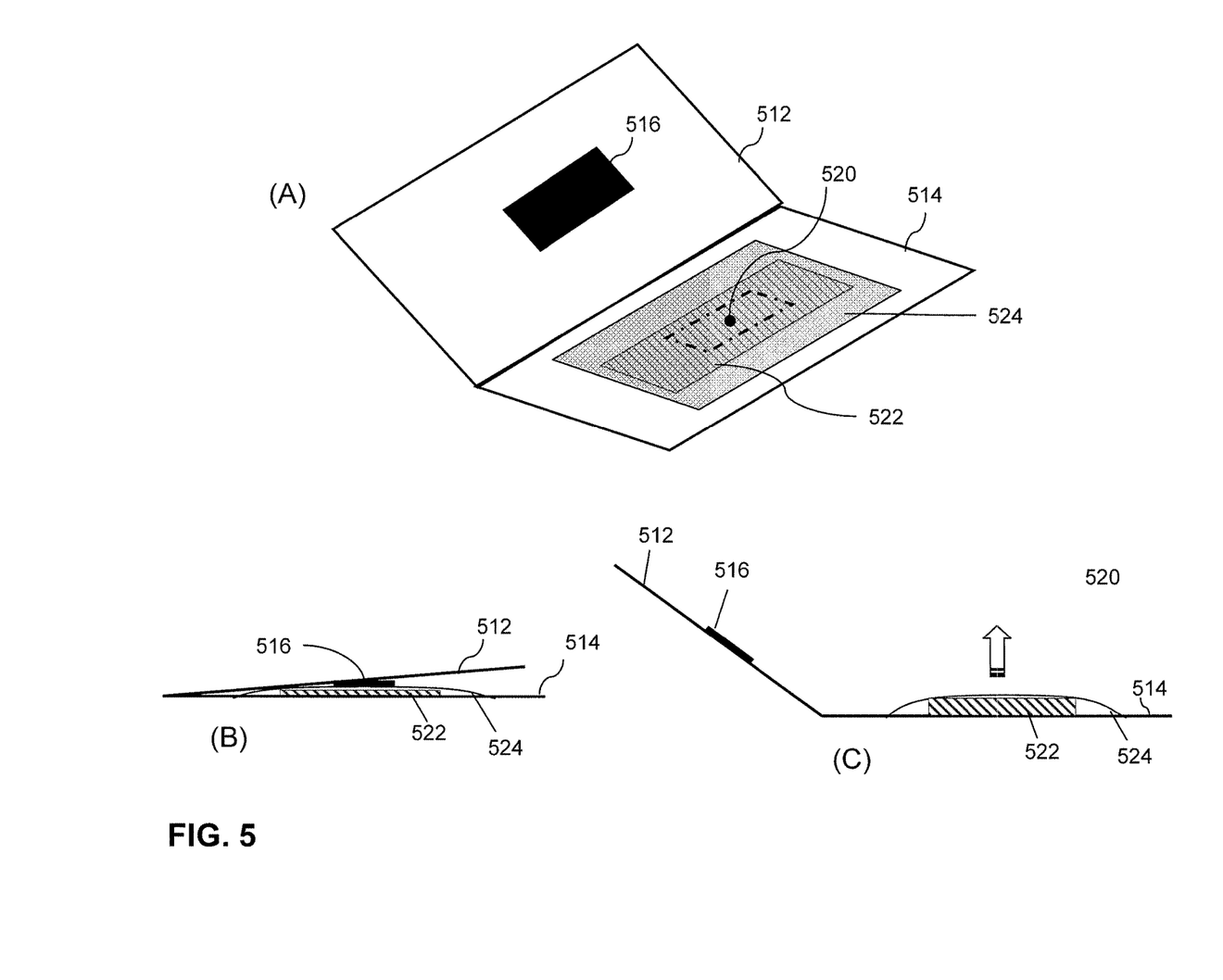
FIG. 5A-5C depict schematics of an expandable spacer structure according to another embodiment of the invention.
Figure 6:
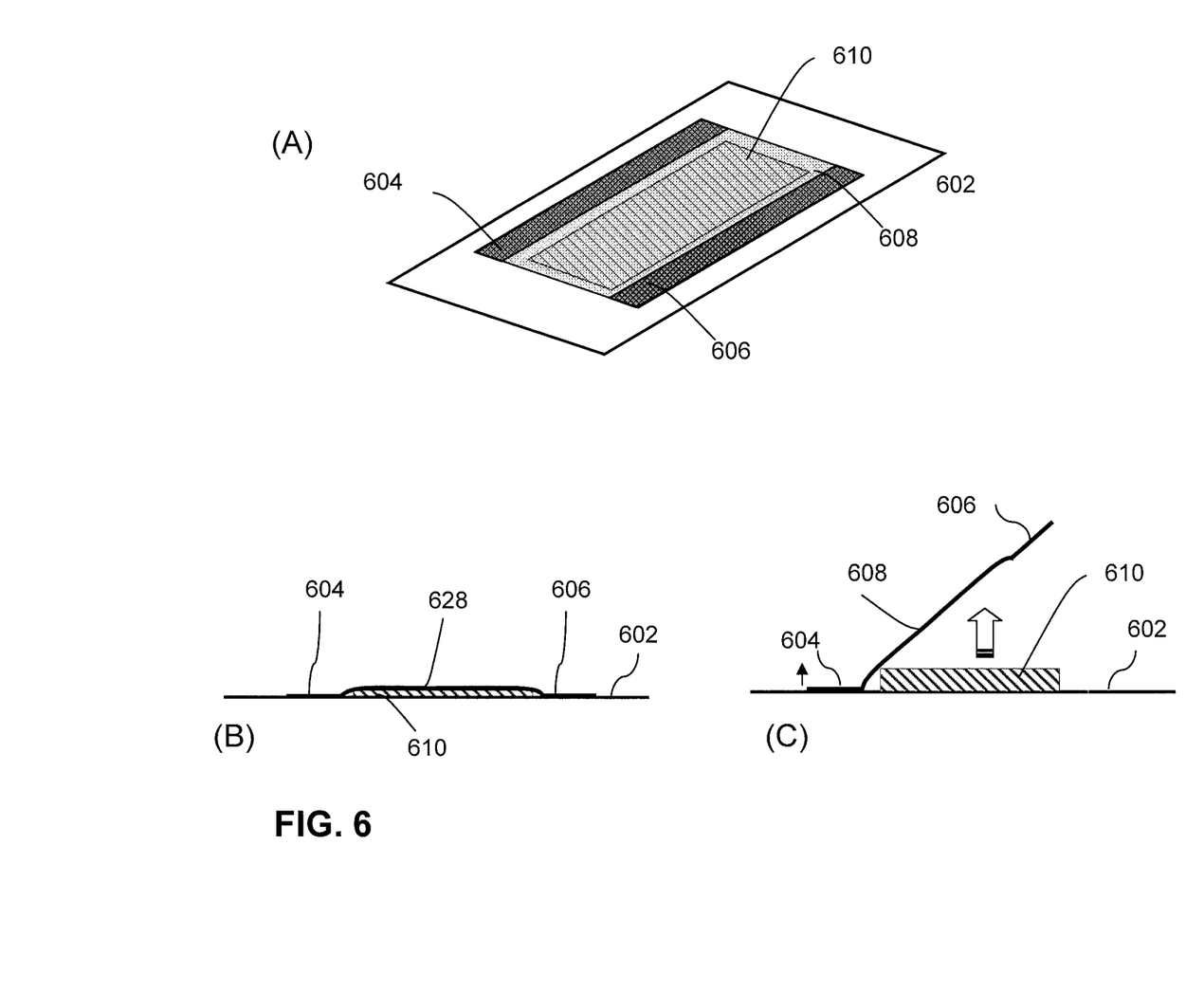
FIG. 6A-6C depict schematics of an expandable spacer structure according to yet another embodiment of the invention.
Figure 7:
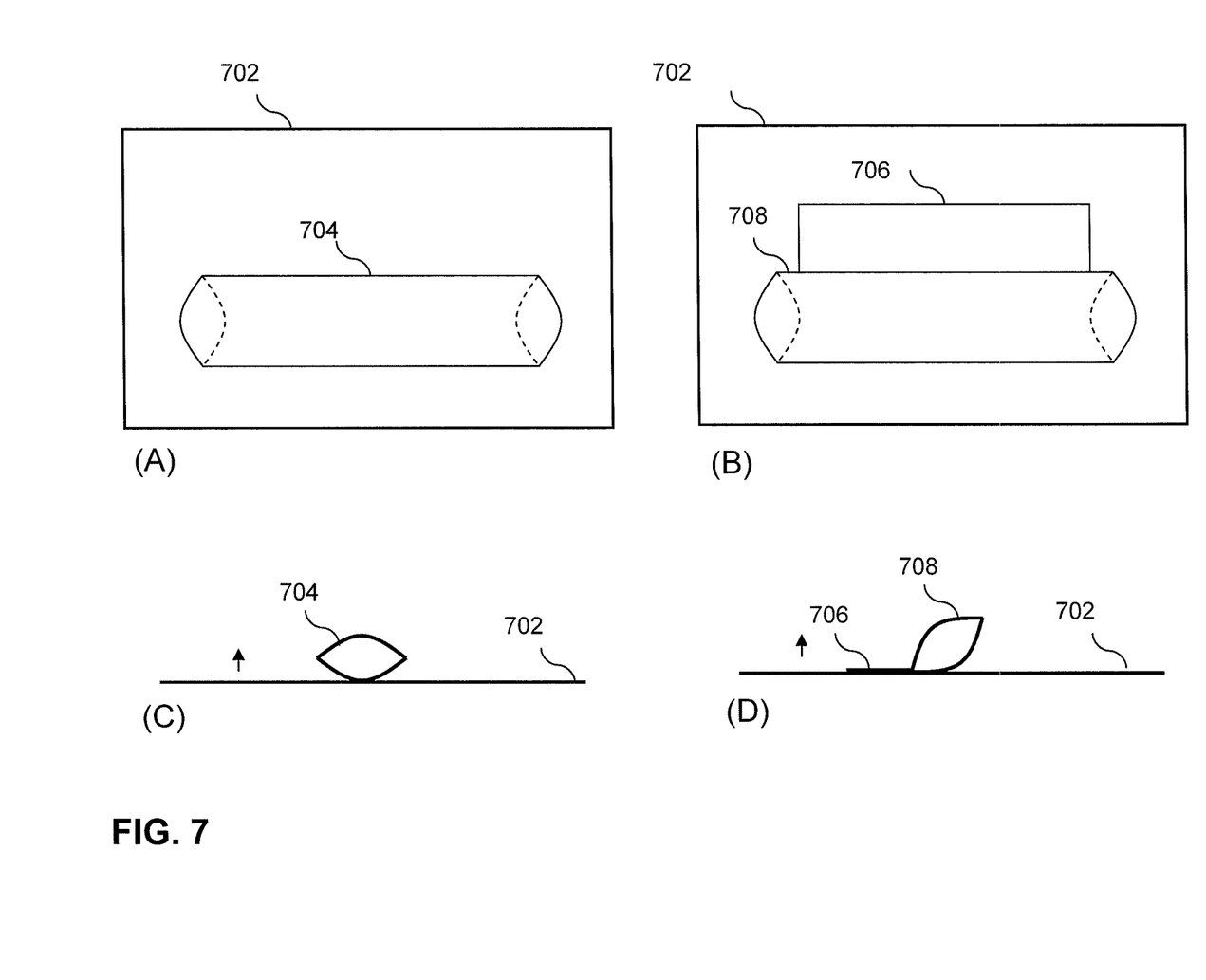
FIG. 7A-7D depict schematics of an expandable spacer structure according to yet another embodiment of the invention.
Figure 8:
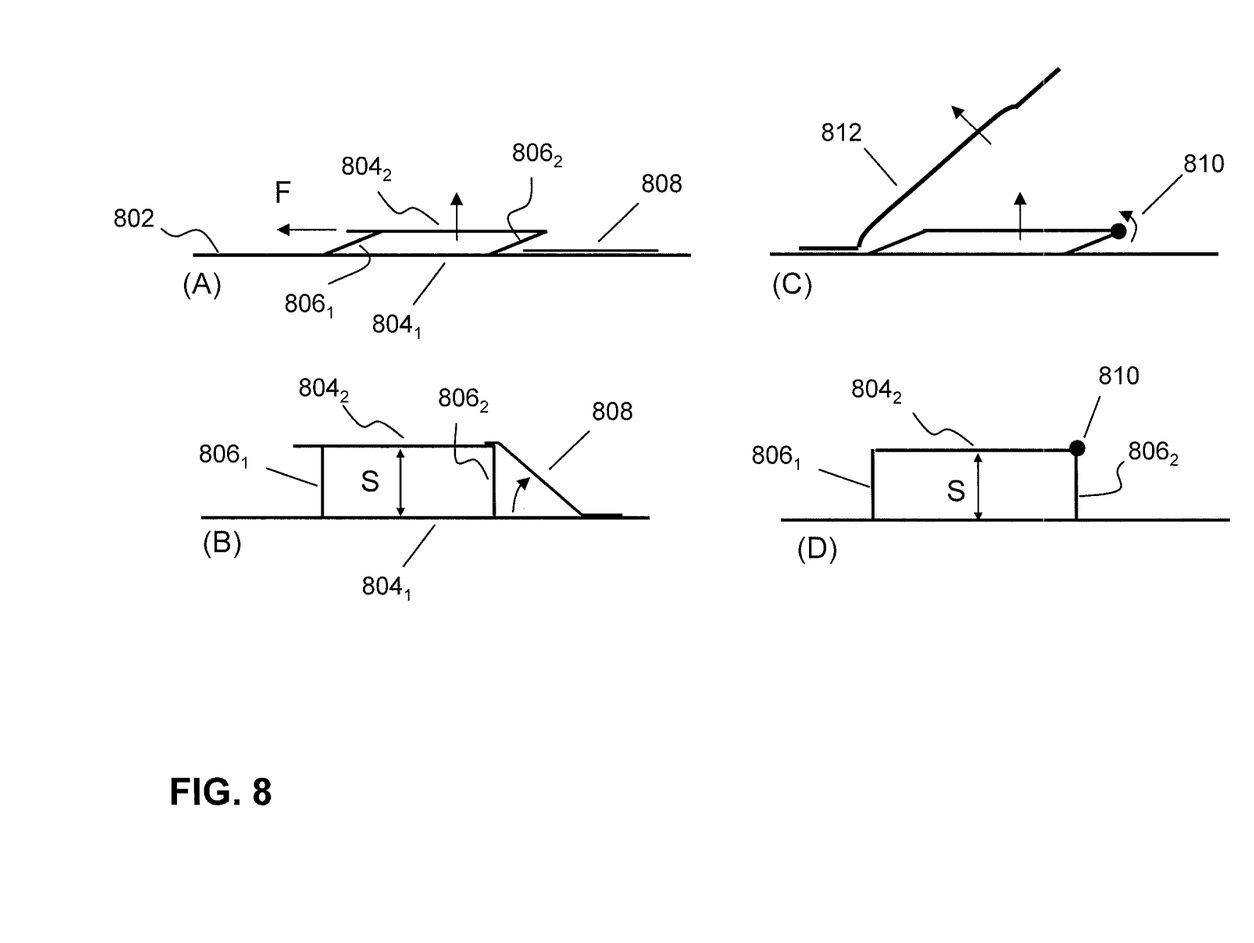
FIG. 8A-8D depict schematics of an expandable spacer structure according to various other embodiments of the invention.

FIGS. 4B (A) and (B) depict top view and side view of a tag structure according to various other embodiments of the invention. The tag structure may comprises a processor 404 and a metallic thin-film antenna structure 406 provided onto a flexible support sheet 402. The processor and the metallic thin-film antenna structure may be protected by a (thin-film) passivation layer. An expandable spacer structure 414 is disposed onto at least part of the antenna and processor area of the tag structure.

In these embodiments, the expandable spacer structure may have a multilayered structure comprising at least an expandable sheet material 408 and one or more dielectric layers 416. FIG. 4B (B) depicts a side-view of an expandable spacer structure comprising an expandable sheet material 408 and at least one layer of a dielectric having a relatively high dielectric constant 416. In this particular example, the antenna structure of the tag may be impedance matched (i.e. tuned) to the tag processor taking into account the presence of the thin film dielectric layer of relatively high dielectric constant between 10 and 50 in the direct proximity of said antenna structure.

The presence of a dielectric layer may partially "screen" the proximity of the body. In one embodiment, the layer may have a thickness of between 0.05 and 5 mm. In another embodiment the layer may comprise titanium dioxide. The layer may be formed of a polymer comprising titanium dioxide particles as a filler in order to increase the dielectric constant of the layer to a desired value.

In further embodiments (not shown), the dielectric layer 416 may comprise multiple dielectric layers, for example a first dielectric layer of a relatively low dielectric constant (e.g. between 1 and 5) at the interface with the tag structure and a second dielectric layer of a relatively high dielectric constant (between 10-50) on top of the first thin-film dielectric layer at the interface with the expandable spacer layer 408.

In one embodiment, the dielectric layers may formed on the basis of a polymer comprising one or more dielectric fillers (e.g. titanium dioxide, silicon dioxide, aluminium dioxide, aluminosilicates, etc.) in order to form a dielectric layer of a desired dielectric constant. The dielectric constant of such layer may be controlled by controlling the composition and/or concentration of the dielectric fillers (mixture) in the polymer carrier layer.

Hence, from the above it follows that the expandable spacer for use in a bib tag provides a simple and very cost efficient way of providing a desirable distance between the body and the tag. In one embodiment, the spacer is activated when the body starts to sweat. As the water-expandable material may come in very thin flexible sheets, it does not affect the thickness of the bib tag assembly when it is stored or distributed to users. Moreover, no human intervention is needed to activate the spacer.

It is submitted that the disclosure is not limited to the examples of FIGS. 4A and 4B but also encompasses many different layouts and (multi-layered structures). For example, the layered expandable spacer structures described with reference to FIG. 4B may be implemented in a accordance with one of the possible layouts as described with reference to FIG. 4A.

FIG. 5A-5C depict schematics of an expandable spacer structure according to another embodiment of the invention. Support sheet 514 is shown in FIG. 5A-5C with an expandable spacer having several parts. The spacer has cover 524 (or wrapping material) that is adapted to vacuum-seal and compress expandable material 522. While cover 524 maintains a vacuum-sealed state, expandable material 522 is in a compressed state having a reduced height/thickness. The compressed state facilitates shipping and storage of said assembly. Vacuum-seal cover 516 may be a tape-like material that adheres (e.g., removably attached) to cover 524 to keep hole 520 sealed (see FIG. 5B). When the vacuum-seal cover is removed from cover 524, hole 520 is exposed thus breaking the vacuum seal (see FIG. 5C) so that the material expands to its expanded state. The thickness of the expandable material may be selected such that the spacer has a thickness in a range between 5 and 15 mm.

Vacuum-seal cover 516 may be part of a top sheet 512. Alternatively, vacuum-seal cover 516 may be securely attached to top sheet 512. In embodiments where a top sheet is used, when top sheet 512 (and vacuum-seal cover 516) is pulled away from support sheet 514, hole 520 is exposed thus breaking the vacuum-seal. Top sheet 512 may be joined with support sheet 514 at an edge. Alternatively, top sheet 512 may be a portion of a folded support sheet 514.

The backside of the expandable spacer structure may comprise an adhesive such that it may be fixed to the backside of a bib like a sticker. A bib tag assembly as e.g. described with reference to FIG. 1 may be provided with such expandable spacer structure. When affixing the bib tag assembly to a shirt, the user only needs to break the vacuum-seal in order to bring the spacer structure into its expanded state.

FIG. 6A-6C depict schematics of an expandable spacer structure according to yet another embodiment of the invention. In this particular embodiment, a cover providing pressure onto an expandable material (resulting in a compressed state of the expandable material) is removed or opened such that pressure would no longer be applied to the expandable material. When the pressure is no longer applied, the expandable material expands to the desired thickness in order to function as a spacer for a bib tag assembly. Exemplary compression means is shown as cover 608 having at least two portions 604, 606 that enables cover 608 to firmly and tightly compress expandable material 610, e.g. a foam sheet, to supporting sheet 602. Cover 608 firmly applies pressure to expandable material 610 and may be removably attached to support sheet 602 at portion 604 and/or 606. When cover 608 is removed or opened, the compressed material expands in thickness/height to serve as a spacer, as seen in FIG. 6C.

The backside of the expandable spacer structure may comprise an adhesive such that it may be fixed to the backside of a bib like a sticker. A bib tag assembly as e.g. described with reference to FIG. 1 may be provided with such expandable spacer structure. When affixing the bib tag assembly to a shirt, the user only needs to remove the cover in order to bring the spacer structure into its expanded state.

FIG. 7A-7B depict schematics of an expandable spacer structure according to yet another embodiment of the invention. In this particular embodiment, mechanical means for an expandable spacer may be used to create the desired space between the support sheet (as well as the tag) and the body. In FIGS. 7A and 7C, one side of carton 704 is used as a spacer, and said carton is firmly affixed to supporting sheet 702. When end portions are lifted and folded to create a tube-like shape, carton 704 is transformed from a flat carton to a spacer that has expanded in space. Said carton is preferably made of a semi-rigid material that is capable of holding shape and structure in its expanded form. An alternative embodiment is shown in FIG. 7B (compressed state) and FIG. 7D (expanded state), where spacer comprises expandable portion 708 and fixed portion 706, where fixed portion 706 is firmly affixed to supporting sheet 702.

FIG. 8A-8D depict schematics of an expandable spacer structure according to various other embodiments of the invention. In this embodiment mechanically foldable structures fixed to a support sheet 802, e.g. a bib, are used as expandable spacer. These spacer structures may have a folded state (FIGS. 8A and 8C) and an expanded state (FIGS. 8B and 8D). The spacer structure may comprise first and second support members $804_{1,2}$ and first and second side members $806_{1,2}$, which are pivotably connected to the support members. The structure may be made of carton or another suitable material that has sufficient mechanical strength to serve as a reliable spacer in its expanded (erected) state.

In these particular embodiments, when folded the support and side members substantially parallel to the support sheet. In the embodiment depicted by FIGS. 8A and 8B, the spacer may be erected by a user by a pulling force F parallel to the support sheet. Due to the force, the side members are erected in a position substantially perpendicular to the support member thereby creating a desired spacing S between first and second members. A simple fixation mechanism, e.g. a latch 808, may be used to fixate the structure so to keep the structure in its expanded (erected) state.

In a further embodiment, the folded mechanical spacer structure may be configured such that at least part of the pivotable connections between the support and side members is configured to provide a spring force 810, forcing the spacer structure to be in its erected state. Hence, in that case, in order to keep the spacer in its folded state, a cover 812 may firmly applies pressure to the mechanically expandable spacer structure and may be removably attached to support sheet. When the cover is removed or opened, the spring force will cause the structure to go to its erected state (similar to the situation as described with reference to FIG. 6.

One skilled in the art would appreciate other expandable spacer structure are also envisaged. For example, in one embodiment an inflatable air pouches may also be used as a spacer. A pouch may be self-inflating or manually-inflatable by blowing air into the pouch.

Figure 9:
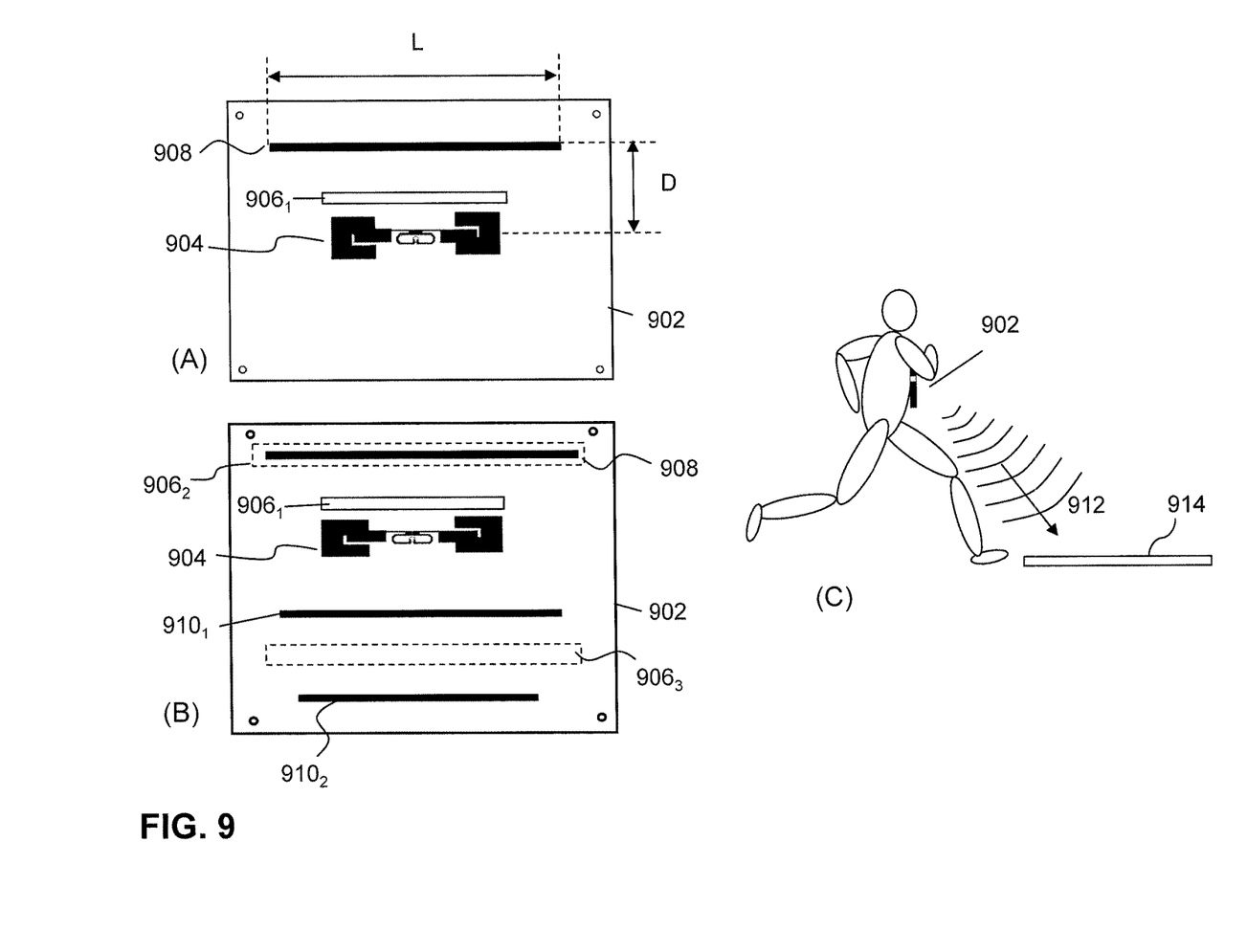
FIG. 9A-9C depict schematics of a bib tag assembly according to a further embodiment of the invention.

FIG. 9A-9C depict schematics of a bib tag assembly according to further embodiments of the invention. As already explained with reference to FIG. 2, efficient coupling between the tag and the antenna is desired when the athlete approaches the antenna. Typically, only a small part of the signal may be picked up by the antenna. Moreover, when a lot of athletes cross the antenna close together, the presence of other athletes close to a transmitting tag may further degrade the signal. For that reason, in the embodiments of FIGS. 9A and 9B the tag assembly may comprise a bib 902 comprising a tag 904 and an expandable spacer structure 906$_1$ (this spacer structure may be implemented in accordance with one of the embodiment as described with reference to FIG. 1-8) and one or more passive elements 908,910$_{1,2}$ for effectively focussing signals transmitted by the tag into a desired direction. As indicated in FIG. 3C, in certain applications the desired signal focussing direction 912 is in the direction of the antenna mat 914, i.e. downwardly, right in front of the participant wearing the bib tag assembly.

The tag may comprise a dipole antenna of an elongated shape. The length is approximately half the wavelength of the operation frequency. By fixing the tag in a horizontal position onto the bib, the antenna signal may be read by an antenna which is positioned in front, above or under the athlete. A conductive passive element 908, e.g. a conductive strip or wire of length L, which is longer than the (effective) length of the tag and which is positioned at a certain distance above the tag may function as a reflector. In that case, if a tag transmits a message (e.g. a backscattered modulated signal) to the antenna mat, part of the signal that is transmitted in a direction away from the antenna mat is reflected back towards the mat antenna, thereby effectively providing means for directing a larger part of the transmitted signal in a particular direction. This way the signal strength of the transmitted message is enhanced and the chance that the message is detected becomes larger.

In one embodiment the reflector may have a length L selected within a range between 100 and 300 mm, preferably 150 and 250 mm, wherein the length of the reflector is longer than the (effective) length of the tag. In another embodiment, the width W of the reflector may be within a range between approximately 1 to 25 mm. In yet another embodiment, the distance D between the reflector and the tag may be selected between 50 and 100 mm. Here the tag may be operated in the UHF range, preferably at a frequency of 865 MHz or 915 MHz.

The reflector may have the form of a conductive thin-film sheet fixed to the bib. Conductive materials may include aluminium, copper, conductive polymers and/or inks known in the art. In a further embodiment, the reflector may be in the shape of a conductive wire, which is fixed to or integrated into the bib material. In one embodiment, a conductive ink or a moist sponge material may be used to form a conductive reflector pattern onto the bib.

Using a reflector as described above, a net gain of approximately 6 dB may be achieved. This allows an increase of the reading distance between a tag and the antenna mat of approximately 30-35%. In one embodiment, further improvement in the tag signal may be achieved using a battery-assisted tag. In that case, a very thin battery in the tag may provide power to feed the IC of the tag.

The bib-tag assembly in FIG. 9B comprises further passive elements 910$_{1,2}$ which are positioned under the tag. These conductive passive elements may be positioned substantially parallel to the tag and have a length which is smaller than the tag length. These passive elements, which are referred to as directors, may help to focus the transmitted in a downward direction. Typically, one or multiple directors may be used. The further a director is position from the tag, the short the length of the director (see e.g. FIG. 9B wherein director 910$_2$ is shorter than director 910$_1$).

The bib-tag assemblies in FIGS. 9A and 9B may further comprise expandable spacer structures 906$_2$,906$_3$ onto and/or within the direct proximity of the reflector and/or director structures such that these passive structures are not or at least less negatively influenced by the direct proximity of the (wet) body of the wearer of the bib-tag assembly.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. For example, the invention is not limited to the use in sporting events and may also be applied in other areas, e.g. tag for use with animals.

The invention claimed is:

1. A tag assembly to be worn by a participant of a sports event during the sports event, the tag assembly comprising:
   a support sheet;
   a tag disposed on the support sheet, the tag comprising an antenna structure and the tag being configured to transmit a signal to a receiver that detects a passage of the participant; and
   an expandable spacer structure disposed on the support sheet spaced away from or partly or fully on top of the antenna structure, the expandable spacer structure providing a predetermined spacing between the tag and a body of the participant, the expandable spacer structure being configured to expand from a non-expanded state to an expanded state of a predetermined spacer thickness, wherein the expandable spacer structure in the expanded state has a thickness in a range between 5 and 15 mm and in the non-expanded state has a thickness smaller than 5 mm, and wherein
   the expandable spacer structure comprises one or more pieces of resilient material configured to adjust at least in one dimension in response to a change in pressure, the non-expanded state including the one or more pieces of resilient material being vacuum packaged, and an expansion to the expanded stated being initiated by breaking the vacuum package.

2. The assembly according to claim 1, wherein
the tag comprises at least one metallic dipole antenna structure; and
the expandable spacer structure is located at at least one of the following locations: (i) within a proximity of the antenna structure; and (ii) at least partly on top of the dipole antenna structure.

3. The assembly according to claim 1, wherein the tag is operative in the ultra-high frequency range.

4. The assembly according to claim 1, wherein the support sheet further comprises one or more metallic passive elements for directing at least part of the signal into a predetermined direction.

5. The assembly according to claim 4, wherein at least one of the passive elements is configured as a reflector.

6. The assembly according to claim 4, wherein at least one of the passive elements is configured as a director.

7. The assembly according to claim 4, wherein at least one of the passive elements is formed onto the support sheet using conductive ink or coating.

8. The assembly according to claim 1, wherein the assembly further comprises a non-expandable spacer structure disposed on the support sheet, the non-expandable spacer structure providing a predetermined spacing between the tag and the body when the expandable spacer structure is not in its expanded state.

9. The assembly according to claim 8, wherein the non-expandable spacer structure has a thickness between 2 mm and 6 mm.

10. The assembly according to claim 1, further comprising at least a dielectric layer disposed between the tag and the expandable spacer structure, wherein
the dielectric layer comprises a high-dielectric material; and
a metallic thin-film antenna structure is impedance matched to a processor taking into account the presence of the dielectric layer in the direct proximity of the antenna structure.

11. A sports bib comprising:
a thin flexible sheet configured to be affixed to articles of clothing or a body of a participant of a sports event, the thin flexible sheet comprising a printed identifier on a front side;
a tag structure comprising a processor connected to a metallic thin-film antenna structure, disposed on the back side of the thin flexible sheet, the tag structure being configured to transmit a signal to a receiver that detects a passage of the participant; and
an expandable spacer structure disposed on the back side of the thin flexible sheet spaced away from or partly or fully on top of the antenna structure, the expandable spacer structure providing a predetermined spacing between the tag structure and the body, the expandable spacer structure being configured to expand from a non-expanded state to an expanded state of a predetermined spacer thickness, wherein the expandable spacer structure in the expanded state has a thickness in a range between 5 and 15 mm and in the non-expanded state has a thickness smaller than 5 mm, and wherein
the expandable spacer structure comprises one or more pieces of resilient material configured to adjust at least in one dimension in response to a change in pressure, the non-expanded state including the one or more pieces of resilient material being vacuum packaged, and an expansion to the expanded stated being initiated by breaking the vacuum package.

\* \* \* \* \*